United States Patent [19]
Miyoshi et al.

[11] 3,870,637
[45] Mar. 11, 1975

[54] APPARATUS FOR SEPARATING FLUIDS

[76] Inventors: Isao Miyoshi; Sadao Sanjo; Toshisuke Takenaka; Shoji Mizutani; Isao Hamana; Seiichi Hayashi, all of 2-1, Hinode-machi, Iwakuni-shi, Japan

[22] Filed: Apr. 3, 1973

[21] Appl. No.: 347,471

[52] U.S. Cl. ................ 210/243, 210/321, 210/433, 210/497.1
[51] Int. Cl. ..................... B01d 31/00, B01d 13/00
[58] Field of Search .......... 210/321, 323, 497.1, 22, 210/23, 433, 243

[56] References Cited
UNITED STATES PATENTS

| | | | |
|---|---|---|---|
| 3,246,764 | 4/1966 | McCormack | 210/321 |
| 3,397,790 | 8/1968 | Newby et al. | 210/321 |
| 3,422,008 | 1/1969 | McLain | 210/321 X |
| 3,528,553 | 9/1970 | Caracciolo | 210/321 |
| 3,664,507 | 5/1972 | Jordan | 210/232 |
| 3,760,949 | 9/1973 | Carey et al. | 210/321 |

*Primary Examiner*—Frank A. Spear, Jr.
*Attorney, Agent, or Firm*—Sherman & Shalloway

[57] ABSTRACT

This invention comprises the elevation of efficiency in function of apparatus for separating the components of a fluid mixture with the use of a great number of hollow filaments of permeable membrane. As steps of improving a degree of separation and productivity of permeated fluids, a structure capable of securing the fluid tight seal with a partition in a fluid separatory chamber even under the increased fluid pressure is in use and the winding state of the hollow filaments is so arranged that the apparatus increases its degree of separation and productivity. As compared with the prior art techniques, the apparatus increases its degree of separation, productivity and durability to pressure.

10 Claims, 6 Drawing Figures

APPARATUS FOR SEPARATING FLUIDS

The present invention relates to an apparatus for separating fluids with the use of hollow filaments of materials having a selective permeability, and particularly the improvements of the apparatus.

Various types of apparatus have hitherto been proposed that separate or concentrate a specified component of a fluid mixture with the use of organic polymeric hollow filaments selectively permeable to different components based on the principles of permeability or ultrafiltration. Typical is McLain U.S. Pat. No. 3,422,008, which discloses in FIG. 8 of the patent that numerous hollow filaments are spirally wound around the periphery of a hollow porous core and both ends of each filament are imbedded in a flange secured to one end of the core. In the apparatus, the shell storing the core is partitioned from a cover positioned opposite the shell with the border at the flange. The fluid mixture is supplied from an inlet of the shell under high pressure and a fluid component which has permeated the peripheral walls of numerous hollow filaments passes through the interior of the hollow filaments and is collected in a fluid separatory chamber positioned outside the flange and passes out. The fluids remaining in a treatment chamber pass out from an outlet of the shell.

The present invention relates to the improvements of McLain U.S. Pat. No. 3,422,008. In FIG. 8 of the patent, the step of elevating separating efficiency is to increase the pressure of the fluid mixture in the shell. However, with increase in pressure, the tight sealing of the outer peripheral surface of the flange working as a partition with the inner peripheral surface of the shell becomes difficult. In McLain U.S. Pat. No. 3,422,008, O-rings are in use, but tight sealing with them, causes them to easily break, when inner pressure in the shell becomes high. In eliminating these defects, the outer portion of the flange is enlarged so as to be held between the cover and the shell and fastened by means bolts. However, this step is very difficult to take, as will be explained below. Maxwell et al. U.S. Pat. No. 3,339,341 discloses one of the complicated steps by which a flange is of castable materials such as a thermosetting resin like an epoxy resin or Wood's metal. The strength of the flange thus cast is not very high. For this reason, a flange held between the cover and the shell will break when it is tightly fastened. If metal can be used for the flange, tight fastening will become possible, but such metal is incapable of imbedding numerous hollow filaments. The fact that castable materials have so far been used for a flange is for imbedding numerous hollow filaments therein. However, the higher strength of the flange cannot be expected.

It seems that in above-mentioned McLain U.S. Pat. No. 3,422,008, the fact that the strength of the flange is low has been taken into consideration. When the fluid mixture is under high pressure in McLain U.S. Pat. No. 3,422,008, the maintenance of a fluid tight seal at the peripheral surface of the flange is difficult.

In the present invention, the same specific considerations have been taken in the improvements on a fluid tight seal. A fluid treatment chamber is filled with high pressure fluids, but a fluid separatory chamber is approximately under normal pressure. Hence, a flange which acts as a partition for the two chambers is pressed toward the fluid separatory chamber. In McLain U.S. Pat. No. 3,422,008, the pressing force is received with a backup plate and a tight seal is effected with the use of O-rings.

In the present invention, a pressing force is utilized for maintaining a tight seal. As embodied, a tapered truncated cone is formed on the periphery of a flange toward a cover by the formation of tapered portions on the outer periphery of the flange. Corresponding tapered portions engaging the tapered portions of the flange are also formed on the internal surface of the cover, The pressure which the high pressure fluids in the fluids treatment chamber apply to the flange is accepted with the tapered surface of the cover in contact with the peripheral tapered portions of the flange having a shape of a truncated cone. A partial component of the force takes part in a tight seal between the cover and the flange. The present invention has been made through such technological ideas and various embodiments have been developed in a considerably wide range.

It is the object of the present invention to provide a fluid separatory apparatus, comprising as a main filter numerous hollow filaments which are spirally around the peripheral surface of a hollow porous core, a flange made of castable materials imbedding and securing both ends of each filament therein, the ends being outwardly opened and a fluids treatment chamber storing them with a cover attached characterized in that the flange forms a truncated cone and the peripheral tapered portions of the flange cooperates with the corresponding internal tapered portions of the cover and its accessory parts so that a fluid tight seal is effected.

It is another object of the present invention to provide a fluid separatory apparatus in which the terminus of the core positioned in a fluids treatment chamber opposite the flange is caused to cover a tubular body protruding from the shell so that the core slides in a tight seal state.

Figure 1:
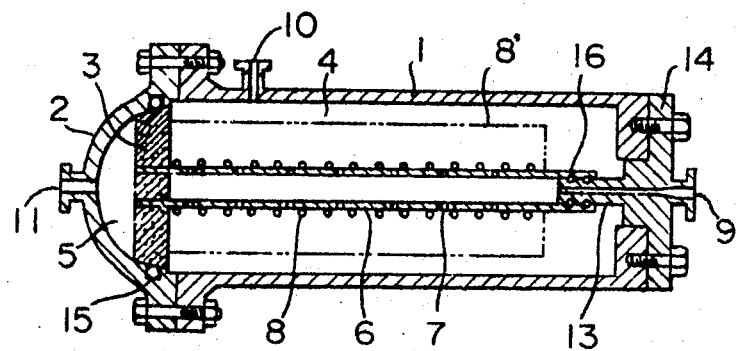
FIG. 1 is a vertical elevational view of one embodiment of a fluid separatory apparatus of the present invention.

One embodiment of the present invention will be described below with reference to FIG. 1. A shell 1 and a cover 2 are connected to each other with their flanges and clamped with bolts to form a housing of the fluid separatory apparatus of the present invention. The apparatus consists of a treatment chamber 4 and a separatory chamber 5. An end plate 14 is mounted to the shell 1 and and inlet 9 is arranged in the center outside of the end plate 14, and communicating with the interior of a hollow porous core 6 with a tubular protuberance 13 extending inwardly. The shell 1 has an outlet 10 for treated fluids and the cover has an outlet 11 for permeated fluids.

A filter comprising the core 6, a spirally wound bundle of hollow filaments 8 and the flange 3 of a cast material is stored in a vessel consisting of the cover 2 and the shell 1. The filter, the appearance of which is shown in FIG. 2, will be described later. The feature of the present invention lies in the connection of the flange 3 of the filter with the vessel. In the embodiment, the engagement between the flange and the cover is important. As is apparent in FIGS. 1 and 2, the flange 3 is of a truncated cone, its peripheral surface being tapered toward the fluid separatory chamber 5. The internal surface of the cover 2 is so tapered that it engages the corresponding peripheral surface of the truncated cone shaped flange 3. In this design, the flange 3 subjected to the pressure of the high pressure fluid in the treatment chamber 4 has its tapered peripheral surface engaging the internal surface of the cover 2. In this case, the higher the pressure of fluids, the greater becomes the pressure contact force in the engaged tapered portions. A tight seal is thus effected, and to help the maintenance of a tight seal an elastic ring 15 is used at the engaged portions.

When the above-mentioned filter assembling is conducted, one end of the filter positioned opposite the flange 3, that is, one end of the hollow porous core 6 should be held in position. When high pressure fluids are evacuated from the treatment chamber 4, the filter becomes freely movable. As a means of preventing the free movement, the end of the core 6 is slidably held in position. The end plate 14 is mounted to the shell 1 and a tubular protuberance 13 is disposed inside the end plate 14 and inserted into the end of the core via an elastic ring 16. In this design, the filter is allowed to slightly slide along the axis of the core 6, other displacement being completely prevented.

The construction of the filter to be used in the present invention will be described below.

As described before, the filter comprises the hollow porous core 6 having many pores 7, numerous hollow filaments 8 and the flange 3. One end of the core 6 is secured in the central portion of the flange 3 and closed. The other end of the core 6 opens in the treatment chamber 4 so as to have the tubular protuberance 13 of the end plate 14 insert slidably into the core 6. This end of the core 6 may slidably be inserted into the tubular protuberance 13.

The numerous hollow filaments are spirally wound around the core 6. Winding of the hollow filaments 8 will be described below, using as an example a single filament. One filament end is imbedded and held in position in the flange 3 and opens in the fluid separatory chamber 5. The hollow filament itself is wound in spiral arrangements around the core 6. when it is wound in a predetermined length, the direction of winding is reversed and the reversed filament is returned up to the flange 3. The other end of the filament is also imbedded in the flange 3 and and opens in the fluid separatory chamber 5. An outer shape of a bundle of the hollow filaments is shown by reference numeral 8' in FIG. 1 and the appearance of the bundle of the filaments is shown in FIG. 2. One way of imbedding and holding a bundle of the hollow filaments in the flange is disclosed in Maxwell et al. U.S. Pat. No. 3,339,341. As a cast material there maybe used an epoxy resin, rubber, Wood's metal, cement, etc.

Figure 2:
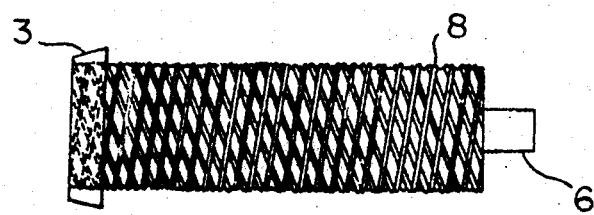
FIG. 2 is an elevational view of a filter.

In the fluid separatory apparatus of the present invention, a fluid mixture is introduced into the treatment chamber 4 through the pores 7 of the core 6 in FIGS. 1 and 2. In the chamber, numerous hollow filaments are mounted and a specified fluid passes through the walls of the hollow filaments via the interior and flow out through the end openings of the filaments into the fluid separatory chamber 5. The fluids filtered and retained in the treatment chamber 4 are discharged through an outlet 10. The fluid mixture may be introduced into the treatment chamber through the outlet 10 and passed out from an inlet 9 into the outside.

Winding hollow filaments 8 around a core 6 is disclosed in McLain U.S. Pat. No. 3,422,008. However just spiralwinding is not effective. It has been found that some considerations are required in the spiralwinding.

The inventors have found the following factors which exert on a filtration phenomenon of the filter:

a. D:Ratio of actual volume of hollow filaments to an apparent volume of the bundle of hollow filaments (Voluminous density of wound volume), b. T:Thickness of the bundle of hollow filaments described above (cm), c. L:Filament length (cm) from one end to the other end of each hollow filament forming the bundle.

d. N:Number of filament end openings in the surface of the flange in the fluid separatory chamber, e. R:Inside diameter of a hollow filament (cm), f. $\eta$:Viscosity coefficient (Poise) of fluids flowing through the interiors of the hollow filaments and g. Q:Rate of flow of fluids flowing through the hollows of the N hollow filaments ($cm^3$/sec).

Considering the interrelation of the factors which exert on filtration function, and combining empirical results into the interrelation, the following limitations are obtained.

1. $0.20 \leq D \leq 0.67$
2. $0 < T \leq -20(D-1)$
3. $0 < L \leq -22.7 \times 10^{-4}(\eta Q/NR^4) + 650$ In other words, it is preferable that the filter body be provided with the above-described conditions. Under these conditions filtration efficiency is raised. The filter body to be used in the fluid separatory apparatus of the present invention has these limitations.

The outside diameter of hollow filaments suited for use in the present invention is 10 to 500 microns, preferably 25 to 350 microns. It is difficult to manufacture stably and in good manufacturing conditions a hollow filament having an outside diameter below 10 microns. When hollow filaments having an outside diameter of 500 microns or above, the area of membrane stored in the treatment chamber is reduced to lower the productivity of permeated fluids. The degree of hollowing of hollow filaments suited in the present invention ranges from 5 to 70 percent, preferably 10 to 65 percent. If the degree of hollowing is 5 percent or below, the membrane thickness of hollow filaments becomes greater to reduce the productivity. If it exceeds 70 percent, the thickness of membrane becomes thin and the shape retention of the hollow filament is deteriorated.

In the present invention, the winding density D of the spirally-wound bundle of hollow filaments wound around a hollow porous core is defined by the above-described formula (1) and it is preferably $0.35 \leq D \leq 0.55$. The density D of winding of the hollow filaments is the ratio of the volume D'' actually occupied by the hollow filaments to the apparent volume D' occupied by a bundle body of the hollow filaments (D''/D').

The apparent volume D' is obtained by calculating the volume of the bundle body of cylindrical hollow filaments wound around the core from the outside and inside diameters of the bundle, including a spaced volume outside of the filaments wound around the core, whereas the volume D'' is the sum total of the actual volume obtained by multiplying the fiber length from end to end of each filament constituting a spirally-wound bundle of filaments by the cross-sectional area of each filament. When the winding density is below 0.20, which means that, when the winding of filaments is loosened, the membrane area useable for filtration becomes smaller, resulting in poor productivity. Since the shape retention of the bundle of filaments is poor, it becomes difficult to handle in subsequent processings such as when imbedding the filament ends in the flange, filament breakage, fuzzing and so forth, tend to occur during the operation. On the other hand, when the winding density exceeds 0.67, the obtained membrane area of the bundle is advantageously increased, but it is undersirable perhaps because adjacent hollow filaments are closely engaged with each other and concentration polarization occurs.

The relation between the thickness and winding density of a bundle to be used in the present invention are defined in the formula (2). It is found that if the winding thickness exceeds $-20(D-1)$ cm defined by the density, the efficiency and degree of separation decrease. In order to increase the membrane area, it is desirable to increase the winding thickness, but if it becomes too great, the concentration gradient of the fed fluid flowing radially along the bundle of filaments becomes great and thus a zone exceedingly low in the concentration of a specified component to be separated occurs. In this case, the purity of the separated specified component lowers undersirably. The filament length L of each hollow filament from one end to the other end constituting a spirally-wound bundle of filament is limited within the range satisfying the formula (3). When the filament length exceeds $-22.7 \times 10^{-4} (\eta Q/NR^4) + 650$ (cm), the tubular path resistance of the fluid flowing inside the filament becomes greater and causes a decreases in the productivity of the permeated fluids.

According to the present invention as described in detail, separation of a specified component from a fluid mixture can be more efficiently conducted than in the prior art since the formation of a bundle by winding hollow filaments around a hollow porous core is conducted so that it has those limitations.

Figure 3:
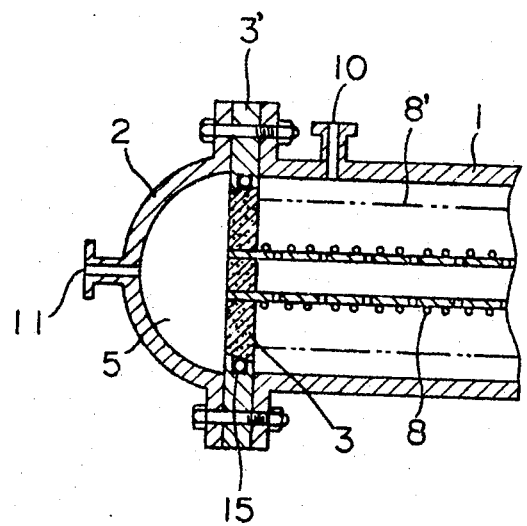
FIGS. 3, 4 and 5 are vertical elevational views showing the modified mountings of a flange.
Figure 4:
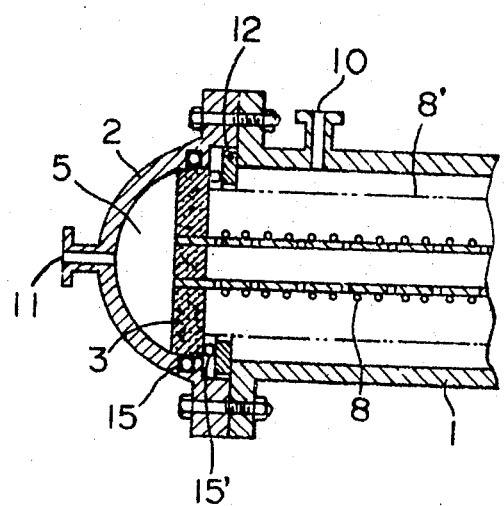
Figure 5:
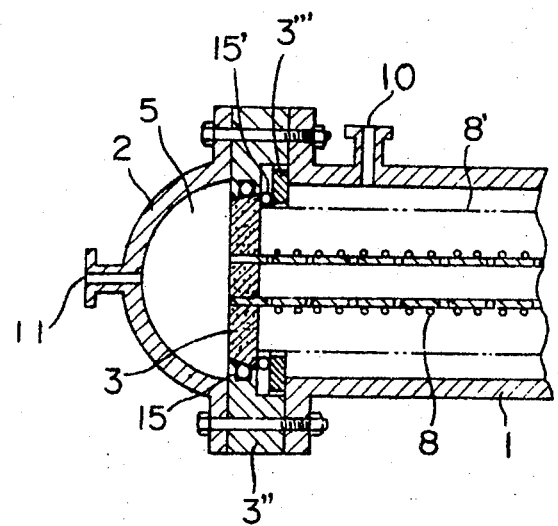

In addition to one embodiment in FIGS. 1 and 2, other embodiments are shown in FIGS. 3, 4 and 5. In FIG. 3, an annular clamp plate 3' made of rigid material, such as metal, is inserted between a shell 1 and a cover 2, and the three members are fastened with botls. The tapered internal surface of the annular clamp plate 3' cooperates with the corresponding tapered portions of the truncated cone-shaped flange 3. In FIG. 1, the tapered internal surface of the cover 2 cooperates with the flange, but in FIG. 3, the annular clamp plate 3' has a tapered portion. It is preferred that an elastic ring 15 be used for the joint.

In FIG. 4, the tapered internal surface of the cover 2 cooperates with the corresponding tapered portion of the flange 3 through the elastic ring 15 as in FIG. 1, and to maintain the joint in position, an annular rigid keep plate 12 is arranged in the shell-side by the aid of an elastic ring 15' positioned between the flange 3 and the keep plate 12. FIG. 5 shows a combination of the embodiments in FIGS. 3 and 4. The flange 3 is engaged with an annular clamp plate 3" having a tapered internal hollow, which is in turn joined to an annular plate 3''' through an elastic ring 15'. In each structure, the truncated cone-shaped flange 3 is joined to the cover 2 or an annular clamp plate attached to the cover to achieve a complete fluid seal.

Figure 6:
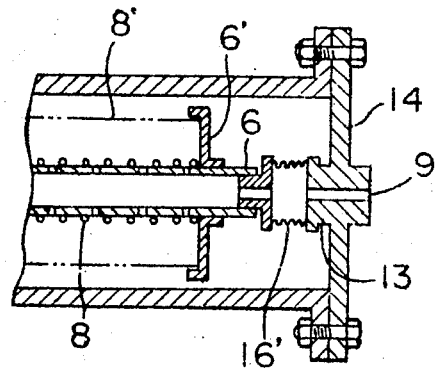
FIG. 6 is a vertical elevational view showing a means of preventing the end of a bundle of hollow filaments spirally wound on a core from sloughing off.

In FIG. 6, the hollow porous core 6 is connected to a tubular protuberance 13 integral with the shell 1 by a bellows 16'. The end of the bundle of hollow filaments in the fluid treatment chamber 4 is covered and protected with a guard plate 6' made of a material such as epoxy resin, metal and so forth, and secured to the end of the hollow porous core 6.

As the hollow filaments to be used in the present invention, the following particular filaments may be employed. The inventors were found the fact that the permeability and degree of separation of a membrane material are contrary to each other and the membrane material having an excellent permeability has a poor degree of separation. In consideration of this fact, the inventors have found a polymer (polymer A) of polyethylene terephthalate series, which has good separability though permeability is not so good, and a polymer (polymer B) which has a good permeability, though its degree of separation is poor, such as polystyrene and polycarbonates. On the basis of such findings, a membrane consisting of two non-porous polymers A and B layers is provided. As for the polymer A layer having a high degree of separation, the thickness of the layer is rendered thin to raise its permeability in addition to maintaining a high degree of separation, and as for the corresponding, permeable polymer B layer, the thickness of the layer is made thick to some extent to have a good pressure resistance. The thickness of the polymer B layer may be 1 to 170 times that of the polymer A layer.

Another type of hollow filaments of a mixed composition comprising 99 to 50 percent by weight of the polymer A of polyethylene terephthalate series and 1 to 50 percent by weight of the different polymer B with a greater permeability coefficient than the polymer A may be in use in this invention, each filament having an outside diameter of 10 to 500 microns. Since as described above, the polymer A exhibits a high degree of separation, the degree of separation of the hollow filaments containing the polymer A is consequently high. Since the mixed polymer B has a great permeability coefficient, the hollow filaments containing the polymer B are naturally high in permeability coefficient. With the hollow filaments having such a composition, the desired permeation is practicable even if a membrane is not made thin, and the thickness can sufficiently withstand the desired pressure.

In the fluid separatory apparatus of the present invention, static electricity is generated by the friction between the fluid mixture and the hollow filaments and thereby a great amount of electric charge is accumulated in particularly inside of a bundle of filament. In ad hoc cases, spark discharge happens to occur. Particularly when the fluid mixture contains an oxidant such as oxygen or an inflammable gas such as hydrogen, methane, acetylene and carbon monoxide, the spark discharge will generate explosive combustion. In order that such disaster may be prevented, it is desirable to mingle an electroconductive fibrous or filmy material having a much higher electroconductivity than the hollow filaments with the bundle of hollow filaments or cover the bundle of hollow filaments with the electroconductive material and ground the electroconductive material. The fibrous material described above is of fibers, strings or ribbons, and the filmy material is of film, tapes or a porous membrane. Preferably, the electroconductive fibrous material may be uniformly dispersed within the bundle of hollow filaments. It is more preferable that the electroconductive fibrous material mingles with the hollow filaments within the bundle and in addition covers the whole outer surface of the bundle of hollow filaments. In covering the whole surface of the bundle, the electroconductive fibrous material is preferably of netting, fabrics or non-wovens. One or more percent by weight of an electroconductive material based on the weight of the hollow filaments may be contained in and/or attached to the hollow filaments, and the resultant hollow filaments may be grounded.

in the produced water were measured. The viscosity coefficient of the produced water at 25° C. was 0.895 × $10^{-2}$ poise. The manufacturing specifications of the bundle of hollow filaments and the results of water treatment are given in Table 1.

Table 1

|  |  | Winding density D | Winding thickness cm | Filament length cm | Number of filaments openings | Rate of flow of fed salt solution cc/sec | Rate of flow of produced water cc/sec | Salt concentration in produced water ppm |
|---|---|---|---|---|---|---|---|---|
| Experiments | 1 | 0.23 | 6 | 355 | 2.30 × $10^5$ | 28.0 | 22.7 | 59 |
|  | 2 | 0.45 | 6 | 355 | 4.50 × $10^5$ | 43.0 | 34.2 | 74 |
|  | 3 | 0.52 | 6 | 355 | 5.21 × $10^5$ | 48.0 | 38.7 | 80 |
|  | 4 | 0.63 | 6 | 355 | 6.30 × $10^5$ | 52.0 | 41.5 | 93 |
|  | 5 | 0.17 | 6 | 355 | 1.70 × $10^5$ | 17.0 | 13.5 | 57 |
|  | 6 | 0.52 | 6 | 713 | 2.64 × $10^5$ | 29.0 | 23.1 | 114 |
| Controls | 7 | 0.63 | 8 | 355 | 10.52 × $10^5$ | 60.0 | 48.0 | 196 |
|  | 8 | 0.70 | 6 | 355 | 7.0 × $10^5$ | 52.0 | 42.3 | 143 |

EXAMPLE 1

Diacetyl cellulose hollow filaments spun by a dry spinning process (90 microns in outside diameter and 55 microns in inside diameter) were wound around a hollow porous core (1 mm in pore diameter, 10 mm between adjacent pores, 4 pores on same circumference) of rigid vinyl chloride (170 cm in length, 20 mm in diameter) with the use of a winder to produce various bundles of hollow filaments, having an apparent diameter of 140 or 180 mm with different winding densities and fiber lengths. One end of this bundle of hollow filaments was introduced into a mold for manufacturing a flange so that the bundle was perpendicular to the floor surface of the mold and thereafter an epoxy resin and a curing agent were poured and cast. After the epoxy resin was cured completely, the end of the resin was cut away to allow the interior of the hollow filaments to open in the cut surface. A bundle of hollow filaments with the flange as shown in FIG. 2 was thus obtained.

The obtained bundle of hollow filaments was placed in the treatment chamber 4 having a structure as shown in FIG. 1 to prepare a module for treating water. An aqueous solution of common salt having a concentration of 3,000 ppm was fed from an inlet 9 with a plunger pump at 25° C. and a concentrated drain was discharged from an outlet 10. The permeated water thus produced was taken out from an outlet 11. The pressure impressed with the pump in the treatment chamber 4 was maintained at 35 kg/cm²G with a control valve mounted to the outlet 10. 2 or 3 hours after the start of the operation, equilibrium was reached. After the equilibrium, the amounts of the fed aqueous solution of salt were optionally altered in order that the rate of recovery of produced water [(amount of produced water/fed aqueous solution) × 100 percent] in each experiment may be made even to 80 percent. Amounts of the produced water and salt concentration In Table 1, experiments 1 to 4 used the bundle of filaments to be used in the present invention and controls 5 to 8 used the bundle of filaments which did not meet the requirements of the present invention.

In experiments 1 to 4, if winding density D increases despite the use of the bundle of filaments having the same apparent diameter of 140 mm, an available membrane area increases with the result of increase in the amount of produced water. On the other hand, the degree of separation (removal) of salt is gradually lowered. In control 8, when winding density D reaches 0.70, the degree of separation is extremely lowered and salt concentration in the produced water becomes extremely higher, though an amount of water does not much increase over that of experiment 4 having a winding density of 0.63. It seems that when the winding density exceeds a given value, the concentration polarization in the membrane interface increases and accordingly the actual membrane area decreases owing to the contact of adjacent filaments with each other.

Control 5 shows a smaller winding density. When D is 0.17, the bundle of filaments has too much space among the filaments, and handling of them such as imbedding them in an epoxy resin is difficult. In addition, when the bundle of filaments with the hollow porous core attached is positioned perpendicularly, filaments loosely slide along the core. In control 5, salt concentration is low; that is, the degree of separation is good, but a production of water is low. In other words, when the winding density is low, it is hard to handle the bundle of filaments and, therefore, yields are low.

Control 6 shows an example in which the filament length from one end to the other end of each filament constituting the bundle of filaments fails to meet the requirements of the formula 3. The amount of the permeated water is small and the degree of separation (salt concentration in the water produced) is poor. The fact that the productivity decreases when the filament length is longer than the given value can clearly be seen in comparison with experiment No. 3.

In control 7, a bundle of filaments has an apparent diameter of 180 mm, which is greater than those of other experiments. In control 7, only the apparent diameter is greater than that in experiment No. 4, though both are the same in winding density D and filament length L. In control 7, the amount of the hollow filaments to be used (membrane area) is about 70 percent greater than in experiment 4, but the amount of the water produced is just 15 percent greater and moreover the degree of separation is exeedingly lower. It seems that when the diameter of a bundle of filaments becomes greater than a given value, the concentration polarization becomes greater.

As described above, when a bundle of filaments satisfying the conditions of experiments 1 to 4 of the present invention is in use, the productivity and degree of separation are both satisfactory. According to the object of treating fluids, the productivity and degrees of separation should be set. It means that fluids can be desirably treated according to the process of the present invention.

EXAMPLE 2

Hollow filaments having an outside diameter of 90 microns and various percentages of the interior of the hollow filaments were produced by dry spinning of diacetyl cellulose. The filaments were wound around a hollow porous core of a vinyl chloride tube of the same standard as example 1 to prepared a bundle of filaments having an apparent diameter of 140 mm. From the bundle of filaments, was prepared a bundle of filaments with a flange attached as in example 1. The winding density D was 0.34 and the filament length L of each hollow filament from one end to the other end was 355 cm.

As in example 1, the same module was used and an aqueous solution of common salt was fed to measure permeation. 2 or 3 hours after the start of operations, equilibrium was reached. After the arrival to the equilibrium, the amount of the fed solution was optionally altered so that the rate of recovery of produced water was about 80 percent through all experiments, and then the rate of flow of water and salt concentration were measured.

Conditions of experiment:
1. Aqueous solution of salt (a concentration of 3,000 ppm)
2. Impressed pressure: 35 kg/cm$^2$G
3. Operating temperature: 25° C.

Results of water treatments are given in Table 2.

low. It means that the process is too inefficient to be in actual use.

When percentage of the interior of hollow filaments becomes high as in example 12, productivity is extremely high. Hence, it is desirable to use filaments having a great percentage of the interior of hollow filaments in order to increase productivity. But when it is as high as 75 percent as in control 14, pressure resistance of the hollow filaments becomes low. It control 14, the rate of flow of water was found extraordinally increased even at 13 kg/cm$^2$G while pressure rise was being conducted at the time of start of operations. Then salt concentration in the produced water was measured through the measurement of electroconductivity and found exceedingly high. As a result, it was deemed that some filaments constituting the bundle were destroyed by pressure.

What is claimed is:

1. In a fluid separatory apparatus in which a shell having an inlet and an outlet, and a cover having an outlet are joined in a tight seal and form a vessel, a filter is stored in the shell-side zone, and the vessel is partitioned into two chambers of fluid separation and fluids treatment with a cast flange forming one end of the filter, for separating a specified component from a fluid mixture utilizing their different permeation rates through a permeable membrane wall, the improvements characterized in that the filter comprises the cast flange, a hollow porous core in about the centers of the fluids treatment chamber and said flange and a multiplicity of permeable, hollow filaments spirally wound around the core, said flange being of a truncated cone and tapered toward said cover with the tapered portions of said flange cooperating with the corresponding tapered portions of said cover in fluid-tight relation thereto; one end of said core in the cover-side zone is closed and the other end is opened; both ends of hollow filaments spirally wound around said core are imbedded and secured in said flange and have their open ends in the fluid separatory chamber; said permeable hollow filaments being spirally wound around said core by starting the winding in the flange-side zone and after winding a given fiber length reversing in the direction Table 2

| | Outside diameter/ inside diameter ($\mu$) | Percentage of interior of hollow filament (%) | Number of openings of filaments | Rate of flow of fed salt solution (cc/sec) | Rate of flow of produced water (cc/sec) | Salt concentration in produced water (ppm) |
|---|---|---|---|---|---|---|
| Experiments | | | | | | |
| 9 | 90/28 | 10 | 3.38×10$^5$ | 24.0 | 19.1 | 64 |
| 10 | 90/54 | 36 | 3.37×10$^5$ | 29.0 | 23.4 | 58 |
| 11 | 92/60 | 43 | 3.24×10$^5$ | 34.0 | 26.9 | 60 |
| 12 | 92/74 | 65 | 3.26×10$^5$ | 57.0 | 45.7 | 62 |
| Controls | | | | | | |
| 13 | 92/16 | 3 | 3.25×10$^5$ | 12.0 | 9.8 | 63 |
| 14 | 90/78 | 75 | 3.32×10$^5$ | Hollow filaments were broken at 13 Kg/cm$^2$G. | | |

Experiments 9 to 12 were made according to the process of the present invention and controls 13 and 14 failed to meet the requirements of the present invention. The degree of separation of salt from water is very little affected by percentage of the interior of the hollow filaments as seen in the column of "salt concentration in produced water" in the Table, while productivity increases with it. In experiment 13, percentage of the hollow is as small as 3 percent, and productivity is of the flange, such windings being repeated to form a bundle of the filaments, so that each filament satisfies the following conditions:

1. $0.20 \leq D \leq 0.67$
2. $0 < T \leq -20(D-1)$
3. $0 < L \leq -22.7 \times 10^{-4} (\eta Q/NR^4) + 650$ wherein D is the ratio of the actual volume of the hollow filaments to an apparent volume of the bundle of hollow filaments, T is a thickness of said bundle, L is a filament length in centimeters from one end to the other end of each hollow filament forming the bundle, N is the number of filament end openings in the surface of the flange in the fluid separatory chamber, $\eta$ is a viscosity coefficient in poises flowing in the interior of the hollow filaments and Q is the rate of flow in cc/sec of fluids flowing through the interior of the N hollow filaments, and having in the opening of said core a protuberance of the shell so that said core is longitudinally slidably held in position.

2. A fluid separatory apparatus as set forth in claim 1 including a annular clamp plate in the shell-side zone for causing the engagement between the tapered portions of the flange and the cover by pressing the flange to the interior surface of the cover.

3. A fluid separatory apparatus as set forth in claim 1 including an annular keep plate disposed in the shell-side zone which presses the flange in tight engagement between the flange and the metal ring.

4. A fluid separatory apparatus as set forth in claim 1 in which said is integrated with the shell in the open end of the hollow porous core and holds the core in position with an elastic ring.

5. A fluid separatory apparatus as set forth in claim 1 including bellows for connecting the open end of the hollow porous core and the protuberance with each other.

6. A fluid separatory apparatus as set forth in claim 1 including a cylindrical guard plate mounted about the end of the core so as to protect the end of the bundle of filaments in the treatment chamber.

7. A fluid separatory apparatus as set forth in claim 1 in which the hollow filaments spirally wound around the hollow porous core have membrane walls of double non-porous structure consisting of a polymer layer of a polymer of the polyethylene terephthalate series, and a polymer layer of a different type having a greater permeability coefficient of a specified component to be separated from the fluid mixture than said polymer of the polyethylene terephthalate series and having 1 to 170 times as thick as the layer of said polyer of the polyethylene terephthalate series.

8. A fluid separatory apparatus as set forth in claim 1 in which the hollow filaments consist of 99 to 50 percent by weight of a polymer of the polyethylene terephthalate series and 1 to 50 percent by weight of polymer of a different type having a greater permeability coefficient of a specified component to be separated from the fluids mixture than said polymer of the polyethylene terephthalate series.

9. A fluids separatory apparatus as set forth in claim 1 in which fibrous or filmy materials having a sufficiently high electroconductivity are mingled with or enclose the hollow filaments wound around and are grounded.

10. A fluids separatory apparatus as set forth in claim 9 in which the hollow filaments contain the electroconductive materials in the amount of one per cent or more based on the weight of the hollow filament or have them attached and are grounded.

* * * * *

UNITED STATES PATENT OFFICE
CERTIFICATE OF CORRECTION

PATENT NO. : 3,870,637
DATED : March 11, 1975
INVENTOR(S) : ISAO MIYOSHI ET AL

It is certified that error appears in the above-identified patent and that said Letters Patent are hereby corrected as shown below:

In the Heading, insert patentees' Foreign Application Priority Data as follows:

-- Claims priority, application Japan, August 24, 1972, No. 47/98082. --

Signed and sealed this 29th day of April 1975.

(SEAL)
Attest:

RUTH C. MASON
Attesting Officer

C. MARSHALL DANN
Commissioner of Patents
and Trademarks